United States Patent
McIntosh (10) Patent No.: US 10,577,110 B2
(45) Date of Patent: Mar. 3, 2020

(54) AIRCRAFT CABIN MOISTURE CONTROL USING MOISTURE WICKING HEAT SHRINK TUBING

(71) Applicant: The Boeing Company, Chicago, IL (US)

(72) Inventor: Darren Carl McIntosh, Mulkilteo, WA (US)

(73) Assignee: The Boeing Company, Chicago, IL (US)

( * ) Notice: Subject to any disclaimer, the term of this patent is extended or adjusted under 35 U.S.C. 154(b) by 303 days.

(21) Appl. No.: 15/497,095

(22) Filed: Apr. 25, 2017

(65) Prior Publication Data

US 2018/0305027 A1 Oct. 25, 2018

(51) Int. Cl.
| | | |
|---|---|---|
| B64D 13/00 | (2006.01) |
| B65C 3/16 | (2006.01) |
| B29C 63/40 | (2006.01) |
| B29C 63/00 | (2006.01) |
| B64C 1/06 | (2006.01) |
| B29C 63/42 | (2006.01) |
| B64D 11/00 | (2006.01) |
| B64D 13/06 | (2006.01) |
| B29K 105/08 | (2006.01) |

(52) U.S. Cl.
CPC .......... *B64D 13/00* (2013.01); *B29C 63/0017* (2013.01); *B29C 63/40* (2013.01); *B29C 63/42* (2013.01); *B64C 1/067* (2013.01); *B64D 11/00* (2013.01); *B64D 11/003* (2013.01); *B65C 3/16* (2013.01); *B29C 63/0069* (2013.01); *B29K 2105/0854* (2013.01); *B29K 2995/0049* (2013.01); *B29K 2995/0092* (2013.01); *B64D 2013/0662* (2013.01); *Y10T 428/1328* (2015.01)

(58) Field of Classification Search
CPC .................................................... B64D 13/00; B64D 11/00; B64D 2013/0662; B29C 63/42; B29C 63/40; B29C 63/0017; B29C 63/0069; B64C 1/067; B29K 2105/0854; B29K 2995/0092; B29K 2995/0049; Y10T 428/1328
See application file for complete search history.

*Primary Examiner* — James C Yager
(74) *Attorney, Agent, or Firm* — Felix L. Fischer (57) ABSTRACT

A moisture wicking heat shrink sleeve for aircraft cabin moisture control incorporates a heat shrinkable tube of predetermined length receivable over a structural member. A moisture absorbing layer is adhered to a surface of the heat shrinkable tube with the heat shrinkable tube and adhered moisture absorbing layer configured for radial contraction from a first expanded condition to a second contracted condition upon application of heat.

18 Claims, 11 Drawing Sheets

(PRIOR ART)

AIRCRAFT CABIN MOISTURE CONTROL USING MOISTURE WICKING HEAT SHRINK TUBING

BACKGROUND INFORMATION

Field

Embodiments of the disclosure relate generally to moisture control in aircraft compartments and more particularly to a moisture wicking material disposed about structural connecting members to intercept condensate flowing down the members.

Background

Highly moist air is often present in aircraft cabins which tends to collect in warm volumes in the upper crown of the fuselage. The moisture in the air often condenses during flight operations and collects on interior surfaces. Due to surface tension effects, the condensate tends to flow down connecting structural members in the fuselage, such as tie rods interconnecting cabin interior linings to the fuselage skin structure. This condensate may then trickle through gaps in the interior linings and drip on passengers, the cabin interior furnishings and equipment; an effect known as "rain in the plane".

It is therefore desirable to provide methods and apparatus to prevent or reduce condensation flow travelling via structure or interior members within the aircraft to eliminate condensate dripping within the cabin.

SUMMARY

As disclosed herein a moisture wicking heat shrink sleeve for aircraft cabin moisture control incorporates a heat shrinkable tube of predetermined length receivable over a structural member. A moisture absorbing layer is adhered to a surface of the heat shrinkable tube with the heat shrinkable tube and adhered moisture absorbing layer configured for radial contraction from a first expanded condition to a second contracted condition upon application of heat.

The embodiments disclosed provide a method for condensate capture on structural members in an aircraft cabin wherein a sleeve comprising heat shrinkable tubing with a moisture absorbent layer is extended over a tie rod or similar structural component prior to installation in an aircraft. The tie rod is then installed in the aircraft and heated causing the heat shrinkable tubing of the sleeve to radially shrink.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

DETAILED DESCRIPTION

The embodiments and methods described herein provide a loose fitting sleeve formed of thermoplastic heat shrink tubing with a radially contracting moisture absorbent exterior wrap or coating that can be easily installed and protect a structural element such as a tie rod. Once placed in position, the sleeve is heated to shrink the tubing thereby closely surrounding the tie rod.

Figure 1:
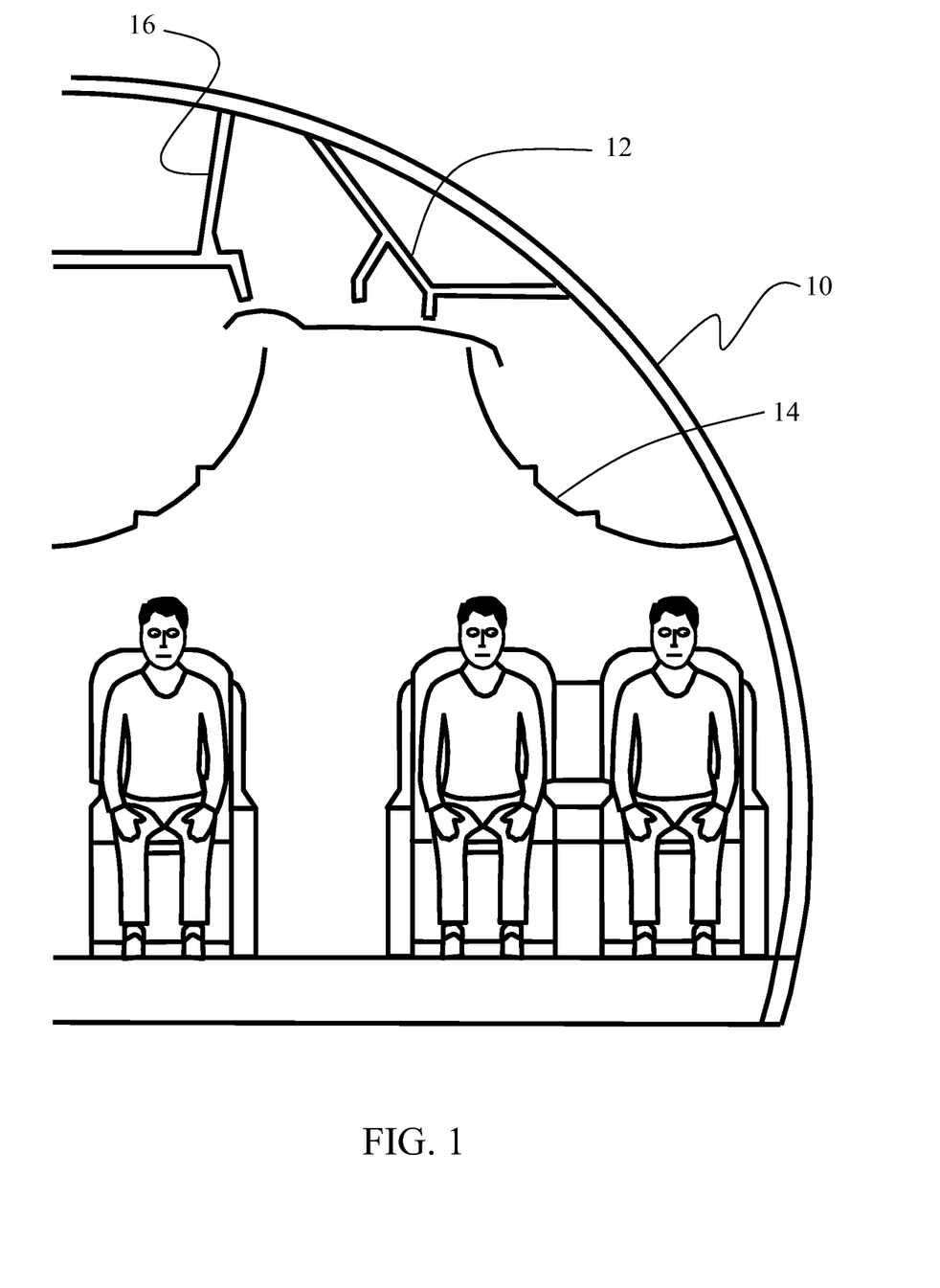
FIG. 1 is partial cross sectional representation of an aircraft fuselage showing interior cabin linings and support structure.

Referring to the drawings, FIG. 1 shows an example partial cross section of an aircraft fuselage with cabin interior fittings and furnishing and supporting structure. A fuselage 10 incorporates supporting structure 12 to attach interior panels and linings 14. The supporting structure 12 typically includes tie rods 16 or similar vertical and angular supports.

Figure 2:
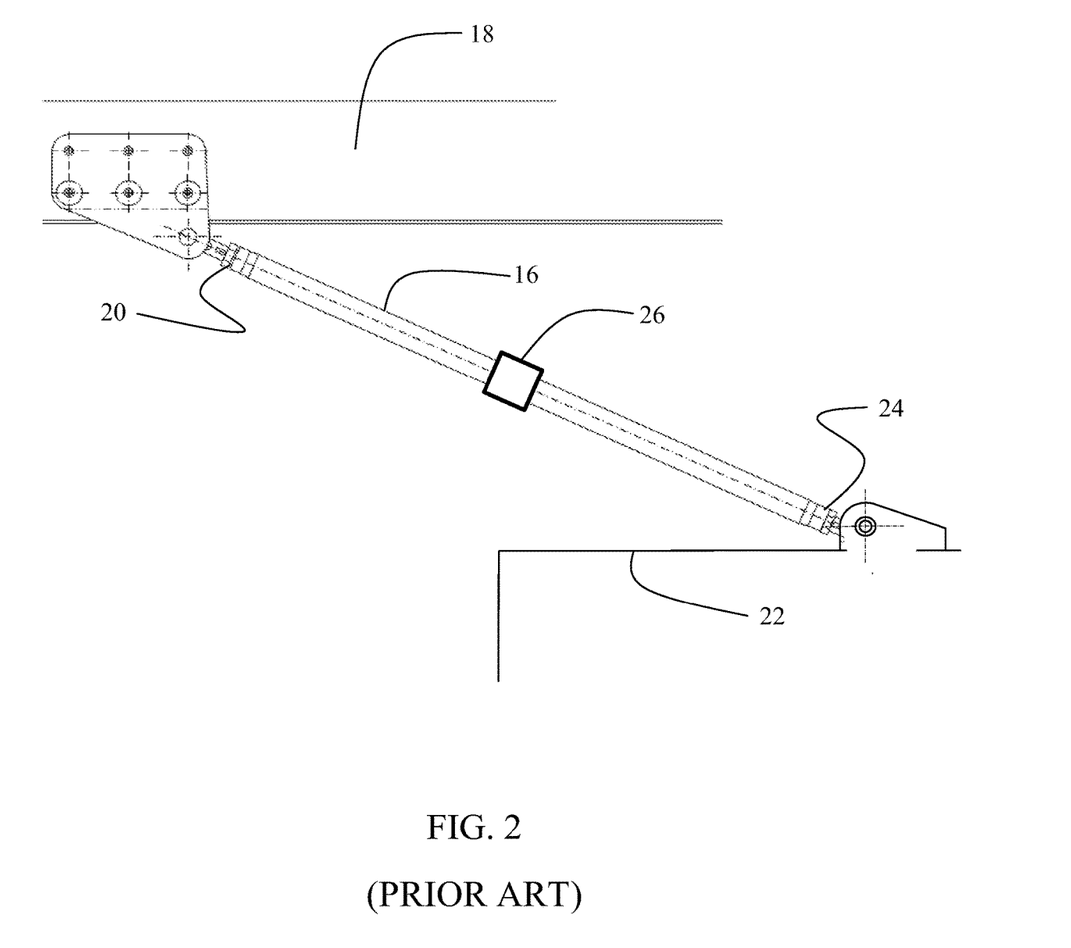
FIG. 2 is a representation of a prior art implementation of a moisture barrier on a support strut or tie rod.

As seen in FIG. 2 for an exemplary attachment with a tie rod 16, fuselage structure 18 is employed to support an upper end 20 of the tie rod and an interior monument or interior panel 22 is connected at a lower end 24. Moisture condensing in the crown of the fuselage tends to run off the structure 18 and down the tie rod 16. As a prior art means of controlling or reducing this flow of condensate, tie rods are wrapped with a single circular strip or ring 26 of felt about 0.75" thick. This has been found to be not as effective as desirable in controlling moisture migration from the upper crown, down structural components and either onto seated occupants, or in the surrounding interior cabin. The felt ring 26 acts like a sponge wicking the moisture as it runs down the tie rod 16, or other structural component, unfortunately this small ring gets saturated very quickly resulting in reduced effectiveness. A more successful approach is adhering the same felt thickness in a spiral (cork screw or candy cane type) arrangement on the tie rod 16, but this is very labor intensive and is difficult to apply in a consistent repeatable manner. In current assembly applications in aircraft, tie rods are wrapped in protective material during the build and this protective material is then discarded once airplane assembly is complete.

Figure 3:
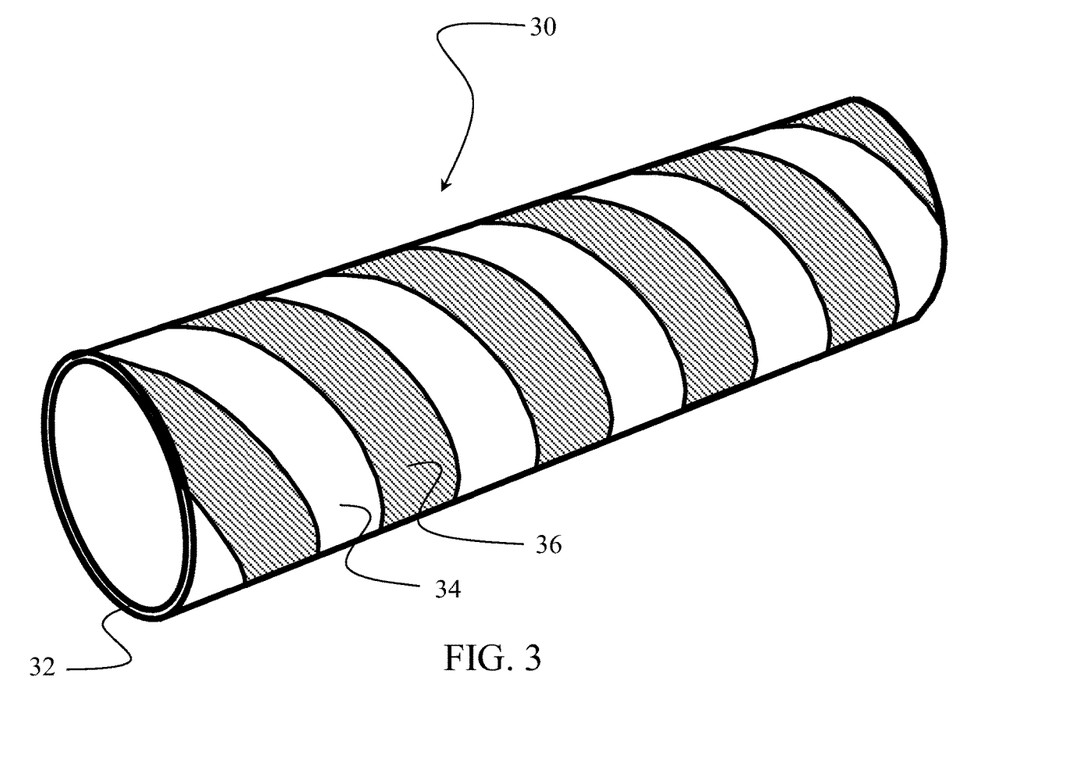
FIG. 3 is a pictorial representation of a first embodiment of a moisture wicking heat shrink tubing for engagement on a cabin structural support employing a spiral wrapped felt.
Figure 4:
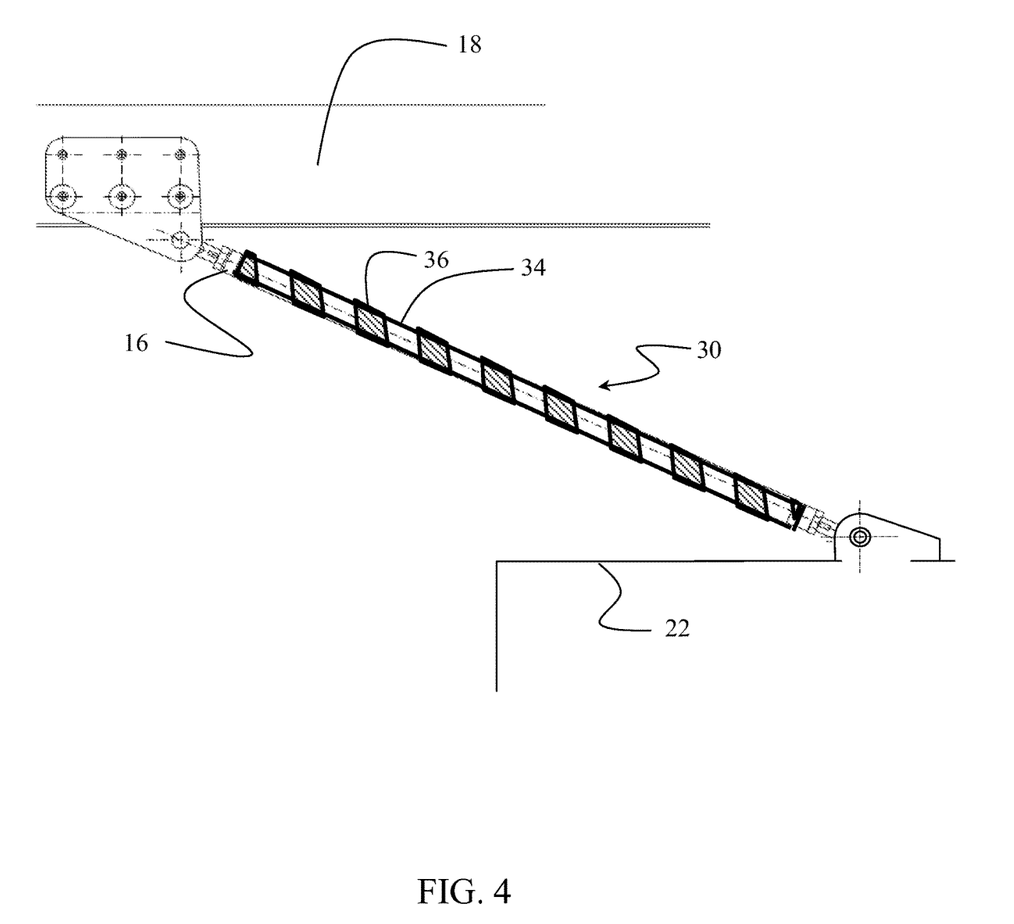
FIG. 4 is a representation of the embodiment of FIG. 3 on a support strut or tie rod.

A first embodiment of a moisture wicking heat shrink sleeve for aircraft cabin moisture control is shown in FIG. 3. A sleeve 30 uses a predetermined length of heat shrinkable tubing 32. A moisture absorbing layer or felt covering such as a felt ribbon 36 is spirally wound on an exterior surface or wall 34 of the tube 32. As disclosed herein, felt is a textile that is produced by matting, condensing and pressing fibers together. Felt can be made of natural fibers such as wool, or from synthetic fibers such as petroleum-based acrylic or acrylonitrile or wood pulp-based rayon. Blended fibers may also be employed. In the expanded state prior to heat shrinking, the sleeve is loosely received over a tie rod or similar structural element and may act as a protective covering for the tie rod during assembly. Once assembly of the tie rod 16 between the structure 18 and interior elements such as monument or panel 22 is complete, heat is applied to the sleeve 30 resulting in shrinking of the heat shrinkable tubing 32 to be closely received around the tie rod 16 as seen in FIG. 4. Use of thermoplastic heat shrinkable tubing provides radial shrinkage while maintaining the longitudinal cut length. Felt also has heat shrink properties as demonstrated in felt hat shrink resizing. Radial shrinking of the heat shrinkable tubing with fixed length may result in tightening of the pitch on the spiral felt ribbon. However, the spiral will radially contract. The spiral wrapped felt ribbon 36 provides moisture wicking down the entire length of the tie rod 16 allowing significantly greater moisture absorbance and drying area when compared to the prior art methods.

The loose fit installation of the sleeve prior to attaching the tie rod into the structure offers significant labor reduction to directly applying spiral wrapping on tie rods. Mass produced extrusion of the heat shrinkable tubing with spiral felt applied during the automated extrusion process is inexpensive. Delivery may be accomplished in a roll with specific sleeves simply cut to the required predetermined length for each tie rod or other structural member. This process ensures consistent spiral application, something the manual application of felt ribbon on tie rods and similar structure would be difficult, if not impossible to do, especially in the many difficult to reach areas of the airplane. A range of standard heat shrinkable tubing diameters may be selected to fit multiple size applications. To shrink, heat is simply applied via a heat gun, or as an alternative, the heat shrink temperature of the shrinkable tubing may be sensitive enough to react to the naturally occurring warmth in the upper crown of the fuselage to provide automatic shrinking. In the latter application the roll may have to be stored in a cooler temperature (refrigerator) prior to installation, to prevent shrinkage prior to installation.

Figure 5:
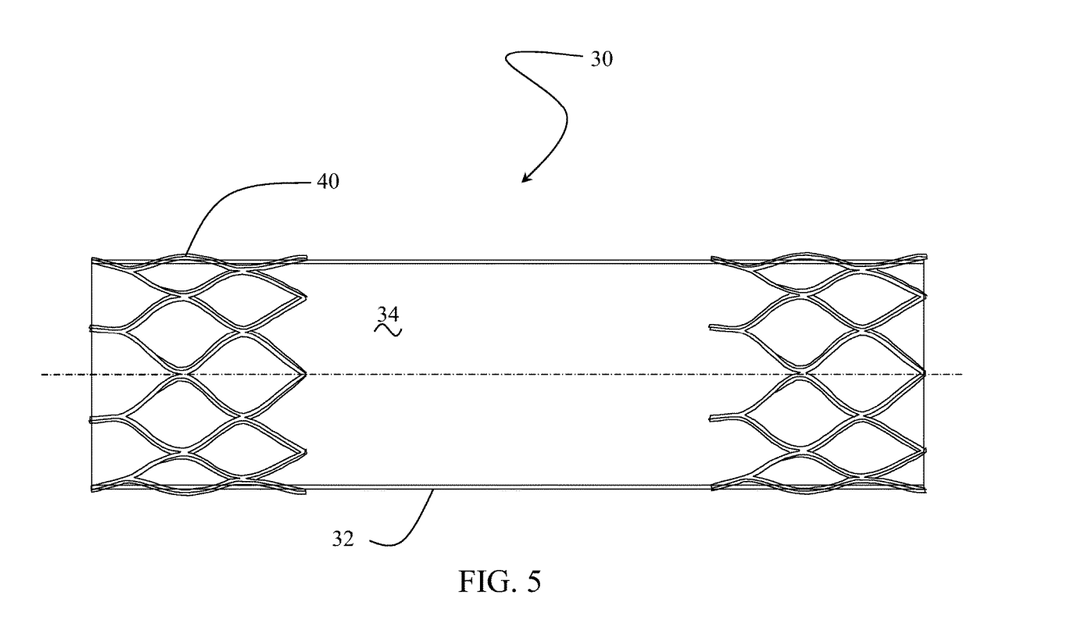
FIG. 5 is a representation of a second embodiment of a moisture wicking heat shrink tubing employing an expandable felt weave.

A second embodiment of the moisture wicking heat shrink sleeve for aircraft cabin moisture control is shown in FIG. 5. The sleeve 30 uses a predetermined length of heat shrinkable tubing 32 as in the initial embodiment. A radially expandable felt weave 40 is received over the exterior surface 36 of the tubing as the moisture absorbing layer. Only end portions of the felt weave are shown in FIG. 5 for clarity. However, the expandable felt weave may be applied to the tubing in a continuous manner or in stripes or multiple separated sections. Radially expandable weave patterns are well known in the art with such applications as arterial stents. As with the application of the felt ribbon in the initial embodiment, the radially expandable felt weave may be applied to the heat shrinkable tubing during extrusion using circular loom weaving or similar processes.

Figure 6A:
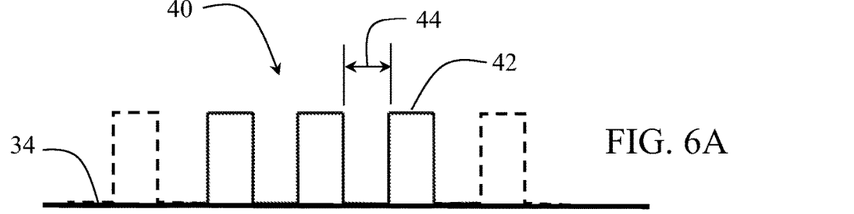
FIGS. 6A-6D are section views of examples of corduroy felt ribbing engaged to the surface of a heat shrinkable tubing segment in an expanded condition.
Figure 7A:
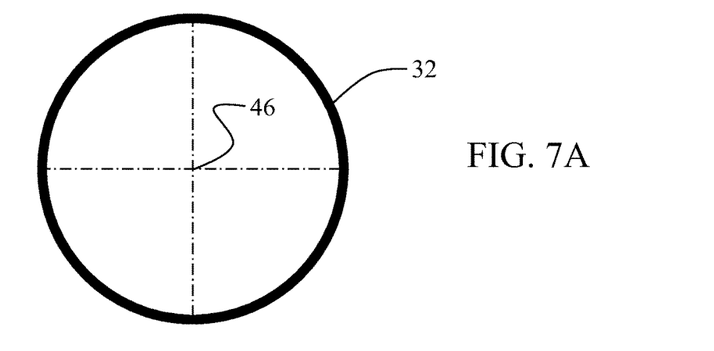
FIG. 7A is a section view of the heat shrinkable tubing segment prior to heat shrink.
Figure 7B:
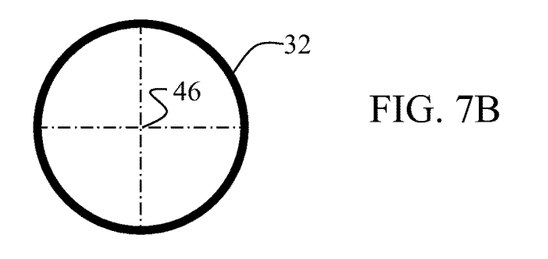
FIG. 7B is a section view of the heat shrinkable tubing segment after heat shrink.
Figure 8A:
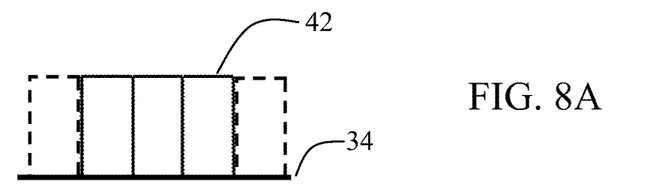
FIGS. 8A-8D are section views of examples of corduroy felt ribbing shown in FIGS. 6A-6D engaged to the surface of a heat shrinkable tubing segment in a collapsed condition after heat shrink.

Referring to FIGS. 6A-6D, to easily accommodate radial contraction of the moisture wicking heat shrink sleeve for aircraft cabin moisture control during heat shrinking, a felt corduroy covering 41 with longitudinal ribs 42 may be applied as the moisture absorbing layer to the heat shrinkable tubing (the ribs parallel to a longitudinal axis of the tubing). The covering may be a continuous fabric with ribs extending from a base fabric web or individual felt ribs. As in the prior embodiments, the corduroy covering or ribs may be applied or adhered to the tubing during the extrusion process with sleeves then cut to predetermined length for use. An exemplary rectangular cross section shape for the longitudinal ribs 42 is shown in FIG. 6A (shown in flat profile at enlarged scale adhered to the tube wall 34). When applied to the expanded heat shrinkable tubing 32 (prior to shrinking) as represented in FIG. 7A, the individual ribs are spaced circumferentially on the tube by a separation distance 44. Upon shrinking of the heat shrinkable tubing 32 about a longitudinal axis 46 as represented in FIG. 7B, the corduroy ribs 42 are contracted radially resulting in gathering about the circumference of the tube 32 substantially eliminating the separation distance as seen in FIG. 8A. This provides a substantially continuous circumferential coverage of the shrunk tube 32 by the corduroy covering 41 for maximum wicking and condensate capture.

Figures 6B, 6C:
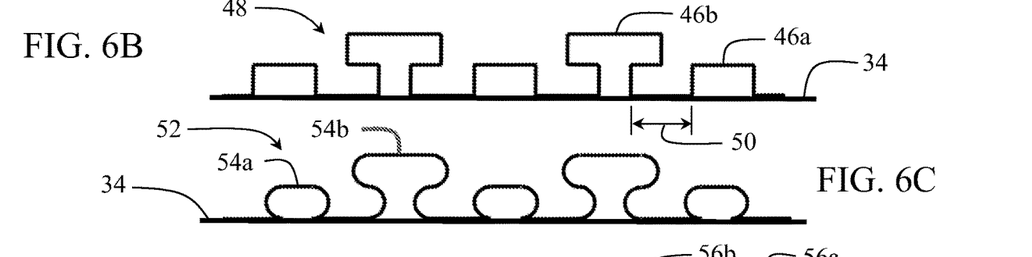
Figure 8B:
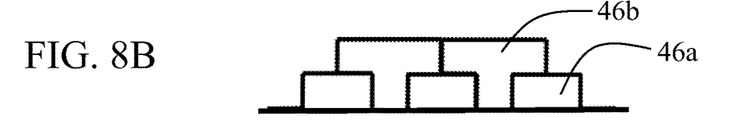
Figure 8C:
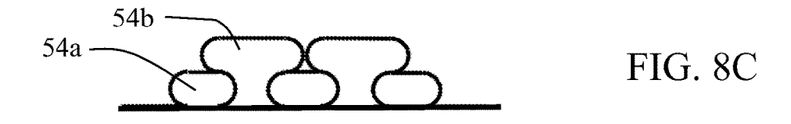

For enhanced performance, adjacent ribs 46a, 46b in a corduroy covering 48 may have complimentary cross sections as seen in FIG. 6B in the expanded condition. The complimentary cross sections allow adjacent ribs to be received against or within their respective shapes. A collapsible separation distance 50 contracts circumferentially as the tube 32 radially shrinks from the expanded condition in FIG. 7A to the shrunk condition in FIG. 7B. Rectangular ribs 46a are sized to be interstitially received within the T-shaped ribs 46b as seen in FIG. 8B. A modified version of this embodiment is shown in FIGS. 6C and 8C wherein in corduroy covering 52 the rectangular ribs 42 of covering 41 are replaced by ribs 54a with an elliptical cross section and the sharp T-shaped ribs 46b are replaced by rounded T-shaped ribs 54b having curves at each vertex shaped to interstitially receive the ellipsoidal ribs.

Figure 6D:
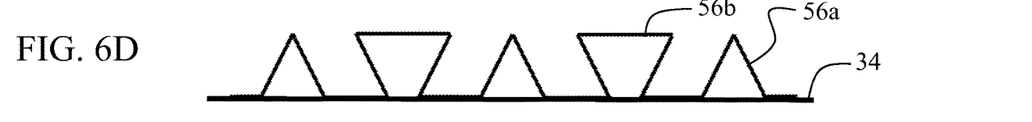
Figure 8D:
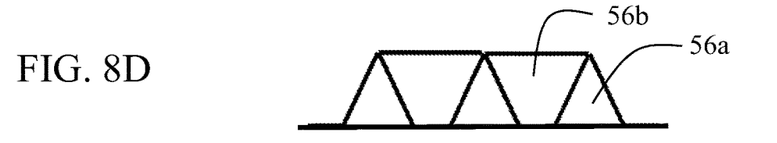

Alternative complimentary shapes for the longitudinal ribs in the corduroy covering may be employed such as triangles 56a and trapezoids 56b seen in the expanded position in FIG. 6D and the shrunk position in FIG. 8D. The shapes employed provide engaging contact between adjacent ribs to provide a substantially continuous circumferential barrier in the corduroy covering to intercept condensate traveling down the structural member over which the moisture wicking heat shrink tubing has been applied. While triangles and trapezoids are shown, any complimentary multilateral shapes having surfaces formed with complimentary angles with respect to the tube wall 34 for engagement may be employed.

Figure 9A:
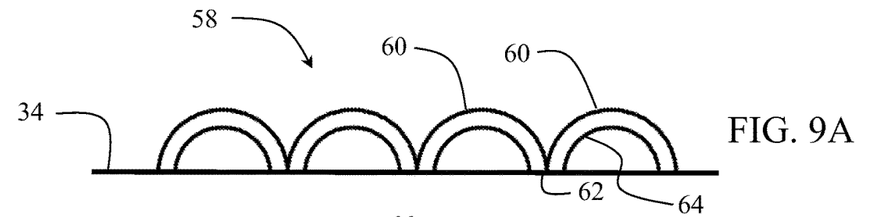
FIGS. 9A-9C are section views of additional examples of moisture absorbent ribbing engaged to the surface of a heat shrinkable tubing sleeve in an expanded condition.
Figure 10A:
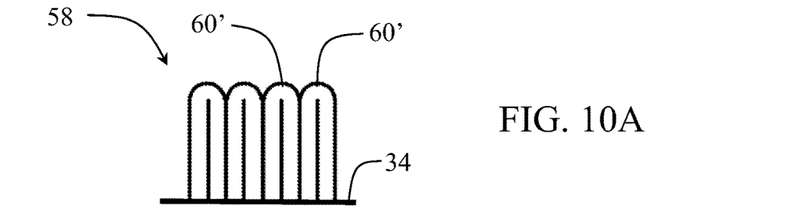
FIGS. 10A-10C are section views of the examples of moisture absorbent ribbing of FIGS. 9A-9C engaged to the surface of a heat shrinkable tubing sleeve after heat shrink.

Yet another alternative corduroy covering 58 is shown in FIGS. 9A and 10A in the expanded and shrunk states. The ribs of covering 58 employ geometric cross sectional shapes which are collapsible to internally close and engage opposing elements of the ribs for intimate mutual contact. The hollow semicircular ribs 60 contact adjacent ribs at diametrical attachment points 62 on the tube wall 34. As the heat shrinkable tube 32 radially contracts from the expanded position of FIG. 7A to the shrunk position of FIG. 7B, the circumferential contraction of the tube wall 34 collapses the semicircular ribs 60 (FIG. 9A) into a collapsed U shape 60' (FIG. 10A) in which an internal surface 64 of each semicircular rib is brought into contact with itself.

Figure 9B:
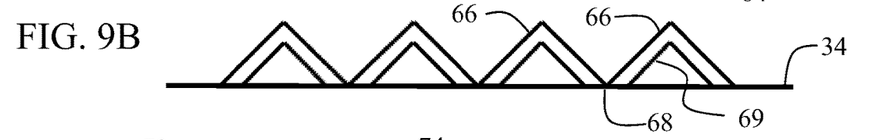
Figure 10B:
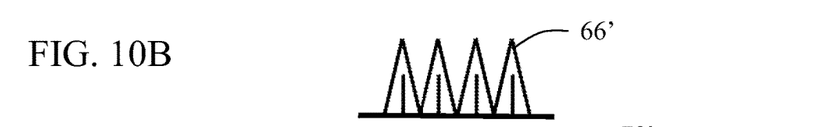

A similar effect is achieved with hollow triangular ribs 66 are in contact at lower vertices 68 on the tube wall 34 in the expanded condition as shown in FIG. 9B. As the heat shrinkable tube 32 radially contracts from the expanded position of FIG. 7A to the shrunk position of FIG. 7B, the circumferential contraction of the tube wall 34 collapses the triangular ribs 66 (FIG. 9B) into a collapsed pyramidal shape 66' (FIG. 10B) in which an internal surface 69 of each hollow triangular rib is brought into contact with itself.

Figure 9C:
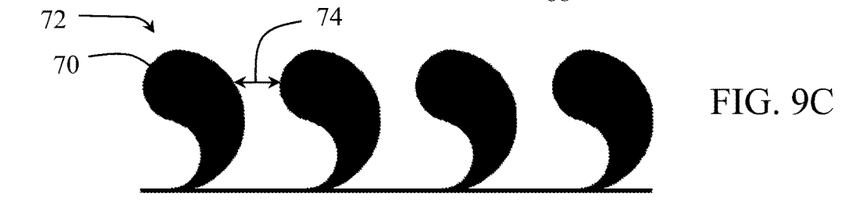
Figure 10C:
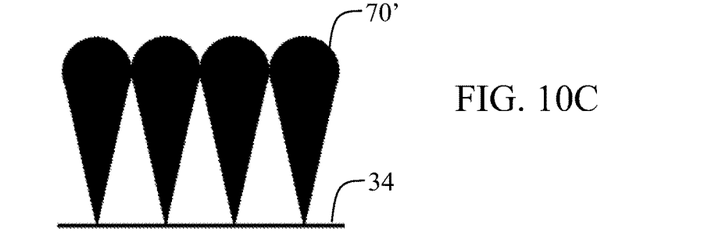

Contacting deformation of longitudinal corduroy ribs 70 as seen in FIGS. 9C and 10C may also be employed for a corduroy covering 72 in which the rib shape, a comma shape in the drawings, deforms upon contact with adjacent ribs to create a complete circumferential cross section for receiving condensate. When applied to the expanded heat shrinkable tubing 32 (prior to shrinking) as represented in FIG. 7A, the individual ribs are spaced circumferentially on the tube surface 34 by a separation distance 74. Upon shrinking of the heat shrinkable tubing 32 about the longitudinal axis 46 the corduroy ribs 70 are contracted radially resulting in gathering about the circumference of the tube 32 eliminating the separation distance and deforming the ribs 70' as seen in FIG. 10C. This provides a substantially continuous circumferential coverage of the shrunk tube 32 by the corduroy covering 72 for maximum wicking and condensate capture.

Figure 11A:
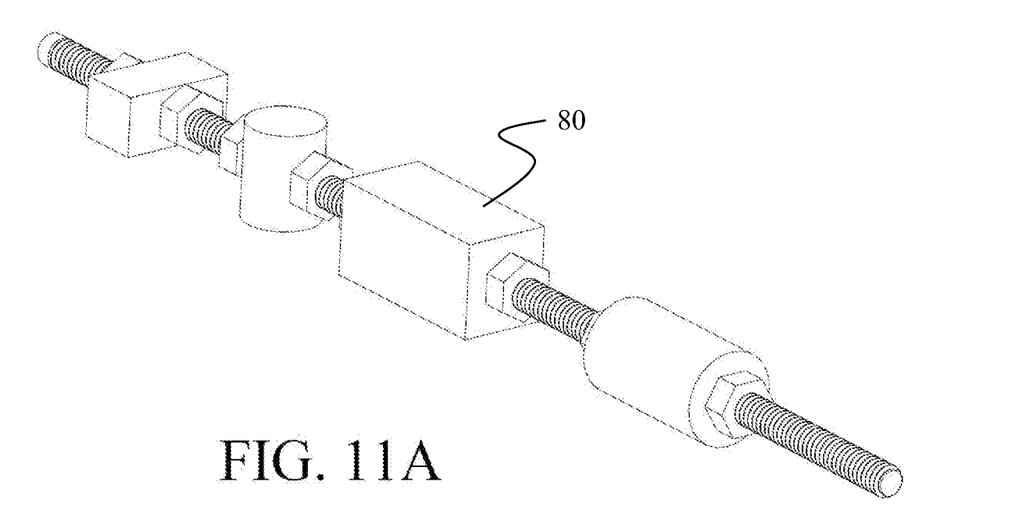
FIG. 11A is an example of a complex structural element over which the exemplary embodiments of moisture wicking heat shrinkable tubing might be employed.
Figure 11B:
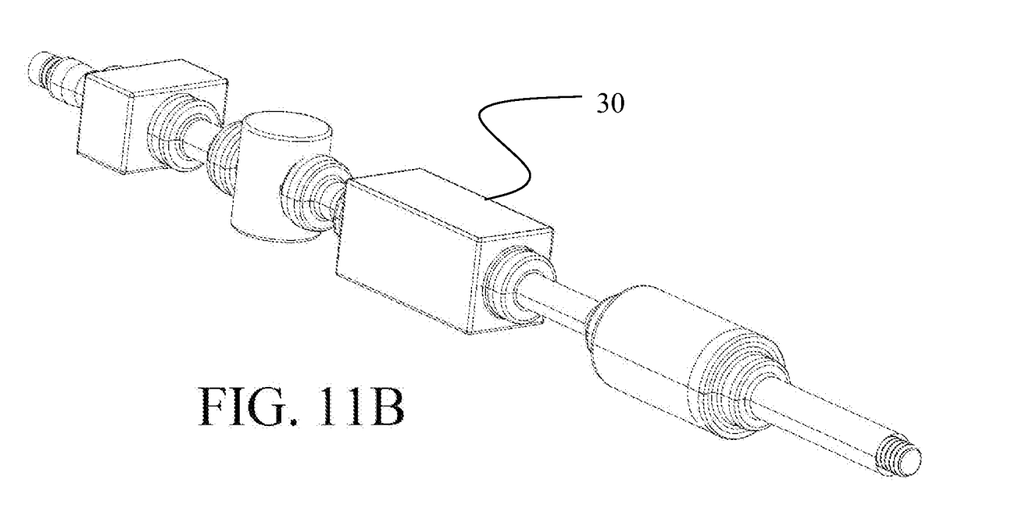
FIG. 11B shows the example structure of FIG. 11A with heat shrinkable tubing extended over the structural element and heated to obtain shrinking.

The advantageous use of heat shrinkable tubing for the sleeves disclosed herein allows the sleeves to adapt to uneven geometrical shapes 80 as seen in FIG. 11A. The heat shrinkable sleeve 30 installed over the shape 80 and then heat shrunk as seen in FIG. 11B provides moisture control for connecting structural shapes where prior art moisture control devices may have been difficult to apply, or may have been discouraged due to the complex shaping.

Figure 12:
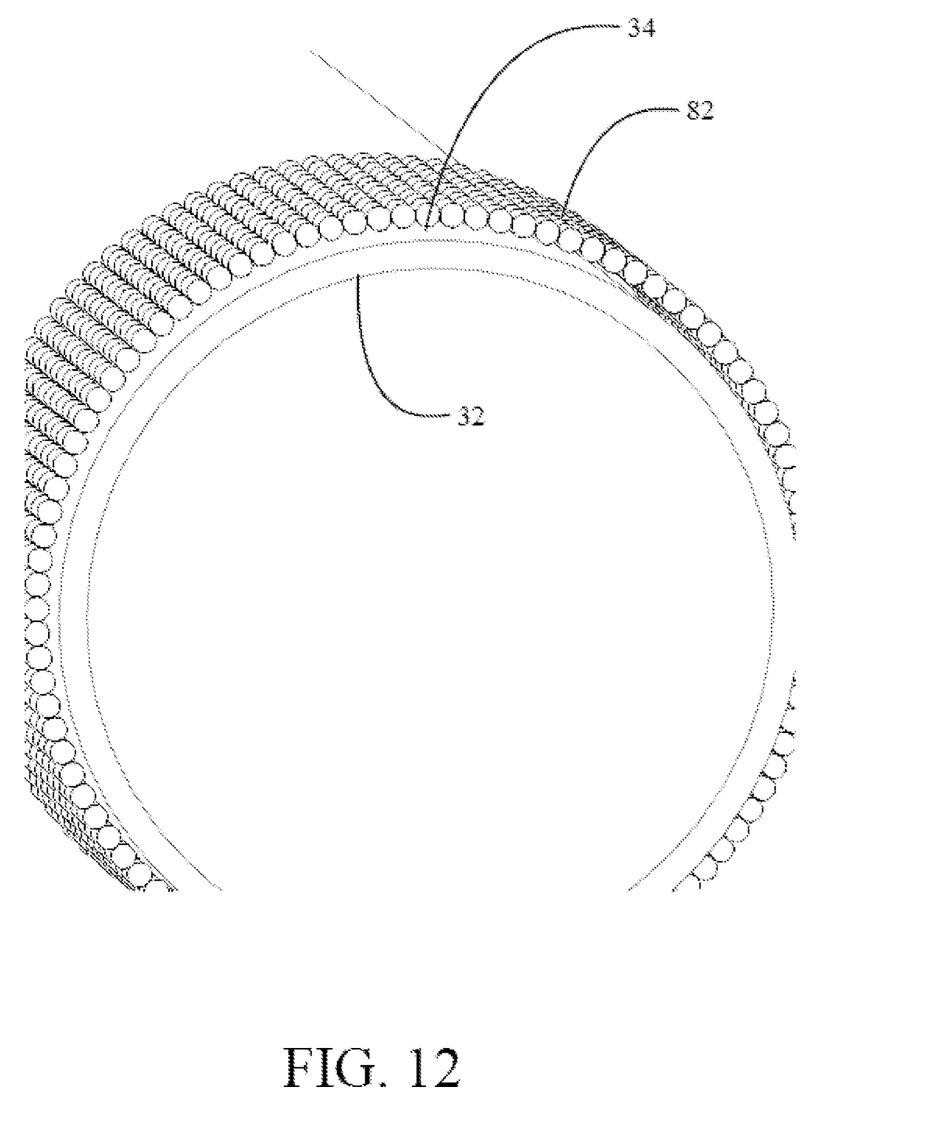
FIG. 12 is a representation of a heat shrinkable tubing sleeve with a moisture absorbent layer created with silica gel or superabsorbent polymers.

As an alternative to a felt covering for moisture absorption, a covering layer 82 of silica gel or superabsorbent polymer (SAP) may be applied to the surface of tube wall 34 of the heat shrinkable tubing 32 forming the sleeve 30 as represented in FIG. 12. The covering layer may be created by directly adhering the silica gel granules or SAP powder to the surface of tube wall 34. A continuous layer providing results similar to the corduroy coverings disclosed herein may be employed or striped or spiral widths may be applied along the length of the tube 32. An intermediate carrier for the SAP powder such as a tape may be employed with the tape applied to the heat shrinkable tubing in a manner similar to the spiral felt ribbon of the initial embodiment. An exemplary commercially available tape product is FROG-TAPE produced by ShurTech Brands, LLC, Avon, Ohio.

Figure 13:
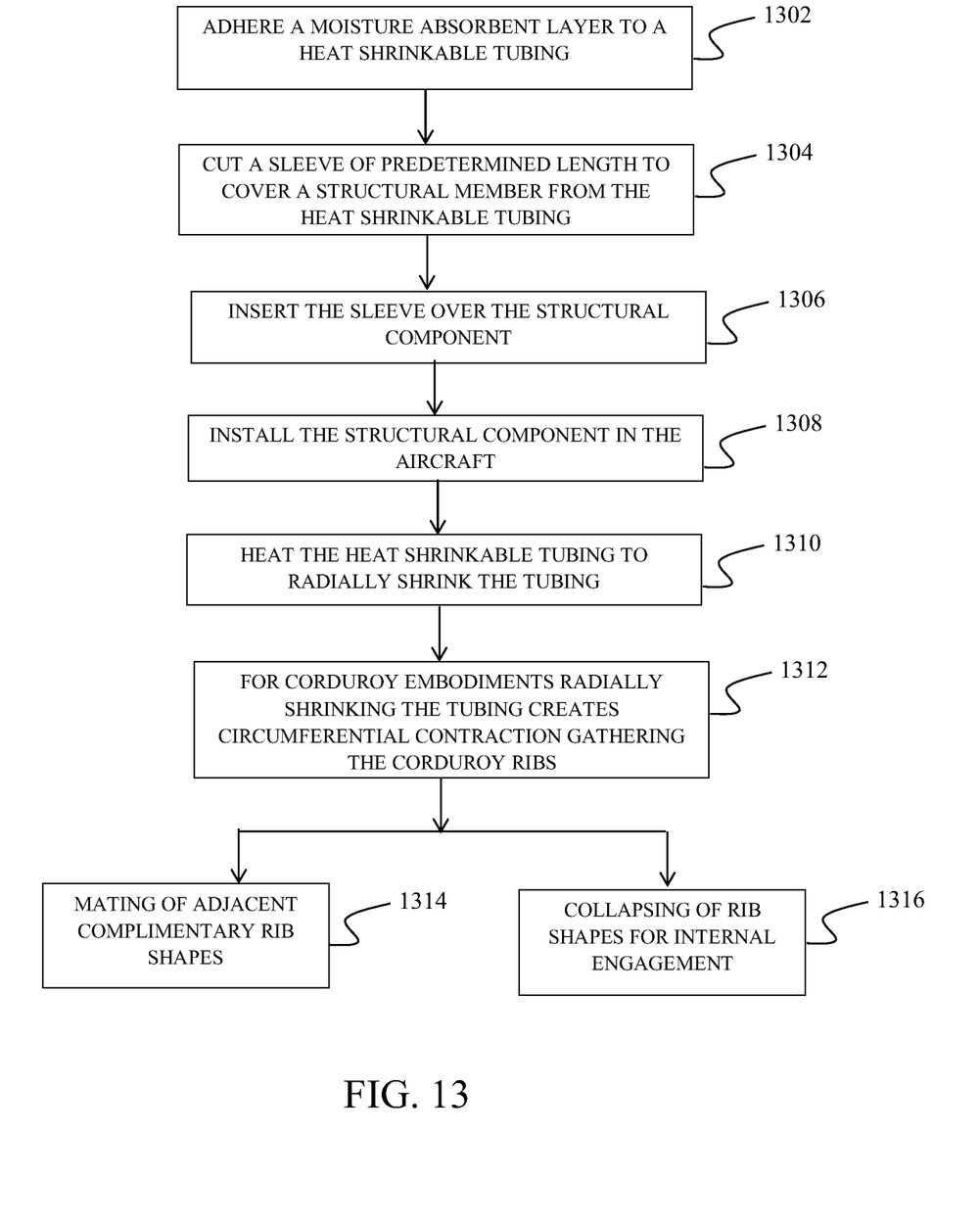
FIG. 13 is a flow chart depicting a method for use of moisture wicking heat shrinkable tubing for moisture control in an aircraft.

The embodiments disclosed herein provide a method for condensate capture on structural members as shown in FIG. 13 by adhering a moisture absorbent layer such as a felt covering to a heat shrinkable tubing, step 1302. The moisture absorbent layer may be adhered or added to the surface of the heat shrinkable tubing during an automated mass production extruding process for the tubing during an uncured semi-fluid state. A sleeve of predetermined length may then be cut from the heat shrinkable tubing, step 1304. The sleeve is then extended over a tie rod or similar structural component prior to installation in an aircraft, step 1306. The tie rod is then installed in the aircraft, step 1308. The heat shrinkable tubing of the sleeve is then heated to radially shrink the tubing, step 1310. For the corduroy embodiments disclosed herein, radially shrinking the tubing creates circumferential contraction gathering the corduroy ribs, step 1312, providing a substantially continuous circumferential barrier for intercepting condensate. With complimentary or collapsible rib shapes, the circumferential gathering further includes mating of adjacent complimentary rib shapes, step 1314, or collapsing of rib shapes for internal engagement, step 1316.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A moisture wicking heat shrink sleeve for aircraft cabin moisture control comprising:
   a heat shrinkable tube of predetermined length receivable over a structural member;
   a moisture absorbing layer comprising a felt covering adhered to a surface of the heat shrinkable tube, said heat shrinkable tube and adhered moisture absorbing layer configured for radial contraction from a first expanded condition to a second contracted condition upon application of heat.

2. The moisture wicking heat shrink sleeve for aircraft cabin moisture control as defined in claim 1 wherein the felt covering comprises a felt ribbon spirally wound on the surface of the heat shrinkable tubing.

3. The moisture wicking heat shrink sleeve for aircraft cabin moisture control as defined in claim 1 wherein the felt covering comprises a corduroy covering.

4. The moisture wicking heat shrink sleeve for aircraft cabin moisture control as defined in claim 3 wherein the corduroy covering incorporates longitudinal ribs parallel to a longitudinal axis of the heat shrinkable tube.

5. The moisture wicking heat shrink sleeve for aircraft cabin moisture control as defined in claim 4 in which the longitudinal ribs are rectangular in cross section and circumferentially spaced by a separation distance in the first expanded condition and engaged by adjacent longitudinal ribs in the second contracted condition.

6. The moisture wicking heat shrink sleeve for aircraft cabin moisture control as defined in claim 4 in which adjacent longitudinal ribs have complimentary cross sectional shape.

7. The moisture wicking heat shrink sleeve for aircraft cabin moisture control as defined in claim 6 wherein one of the adjacent longitudinal ribs has a T-shaped cross section and a mating one of the adjacent longitudinal ribs has a rectangular shaped cross section, said rectangular shaped cross section interstitially received in the T-shaped cross section in the second contracted condition.

8. The moisture wicking heat shrink sleeve for aircraft cabin moisture control as defined in claim 6 wherein one of the adjacent longitudinal ribs has a curved T-shaped cross section and a mating one of the adjacent longitudinal ribs has an elliptical cross section, said elliptical shaped cross section interstitially received in the curved T-shaped cross section in the second contracted condition.

9. The moisture wicking heat shrink sleeve for aircraft cabin moisture control as defined in claim 6 wherein the longitudinal ribs have multilateral cross sectional shapes having surfaces formed with complimentary angles with respect to the surface of the heat shrinkable tube.

10. The moisture wicking heat shrink sleeve for aircraft cabin moisture control as defined in claim 9 wherein one of the adjacent longitudinal ribs is triangular in cross section and a mating one of the adjacent longitudinal ribs is trapezoidal in cross section.

11. The moisture wicking heat shrink sleeve for aircraft cabin moisture control as defined in claim 4 wherein the longitudinal ribs are collapsible to internally close and engage opposing elements of the ribs for intimate mutual contact in the second contracted position.

12. The moisture wicking heat shrink sleeve for aircraft cabin moisture control as defined in claim 11 wherein the longitudinal ribs have a hollow semicircular cross section and adjacent ribs meet at a diametrical attachment points.

13. The moisture wicking heat shrink sleeve for aircraft cabin moisture control as defined in claim 11 wherein the longitudinal ribs have a hollow triangular cross section and adjacent ribs meet at vertices .

14. The moisture wicking heat shrink sleeve for aircraft cabin moisture control as defined in claim 4 wherein the longitudinal ribs are deformable upon contact with adjacent ribs in the second contracted state to create a complete circumferential cross section for receiving condensate.

15. A method for condensate capture on structural members in an aircraft cabin comprising:
  extending a sleeve over a tie rod or similar structural component prior to installation in an aircraft, said sleeve comprising a heat shrinkable tube of predetermined length receivable over a structural member with a moisture absorbent layer comprising a felt covering adhered to a surface of the heat shrinkable tube, said heat shrinkable tube and adhered moisture absorbing layer configured for radial contraction from a first expanded condition to a second contracted position upon application of heat;
  installing the tie rod in the aircraft; and
  heating the heat shrinkable tubing of the sleeve to radially shrink the tubing.

16. The method as defined in claim 15 further comprising the preliminary steps of:
  adhering the moisture absorbent layer to the heat shrinkable tubing;
  cutting the sleeve to the predetermined length from the heat shrinkable tubing.

17. The method as defined in claim 15 further wherein the step of radially shrinking the tubing further comprises circumferentially contracting the tube and felt covering gathering corduroy ribs to provide a substantially continuous circumferential barrier for intercepting condensate.

18. The method as defined in claim 17 wherein corduroy ribs of the felt covering have complimentary or collapsible rib shapes and circumferentially contracting the tube and felt covering further comprises mating of adjacent complimentary rib shapes or collapsing of rib shapes for internal engagement.

* * * * *